H. W. E. PAUL.
NUT LOCK.
APPLICATION FILED FEB. 17, 1917.
1,258,358.
Patented Mar. 5, 1918.
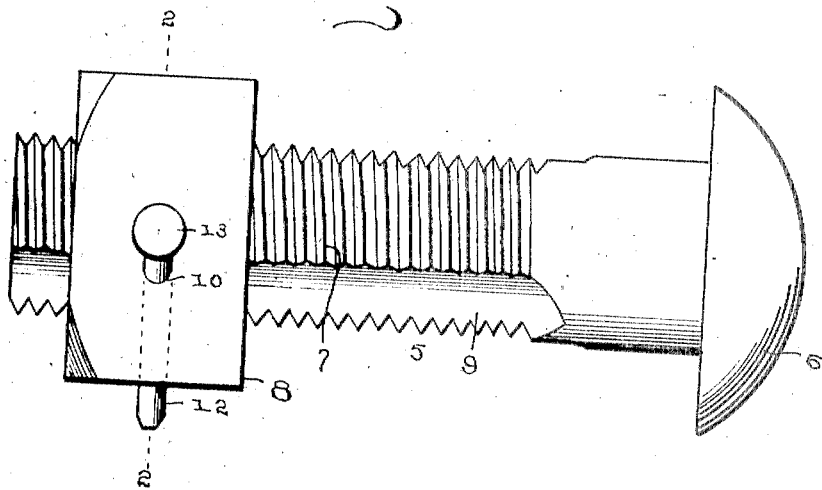
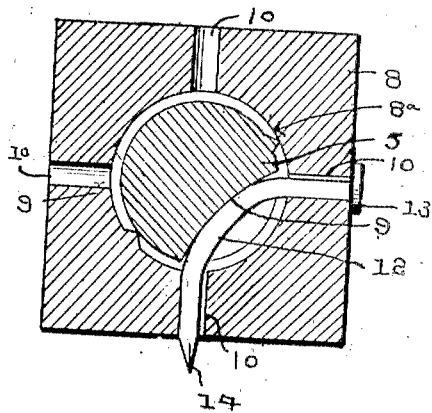
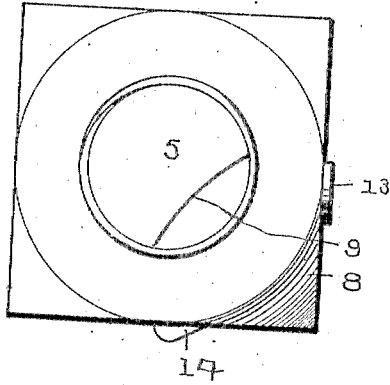
Witnesses.
H. F. Keith,
Inventor
H. W. E. Paul.
By
Attorney

UNITED STATES PATENT OFFICE.

HARRY W. E. PAUL, OF WATTS, CALIFORNIA.

NUT-LOCK.

1,258,358.   Specification of Letters Patent.   Patented Mar. 5, 1918.

Application filed February 17, 1917. Serial No. 149,218.

*To all whom it may concern:*

Be it known that I, HARRY W. E. PAUL, a citizen of the United States, residing at Watts, in the county of Los Angeles and State of California, have invented certain new and useful Improvements in Nut-Locks; and I do hereby declare the following to be a full, clear, and exact description of the invention, such as will enable others skilled in the art to which it appertains to make and use the same.

This invention has for its primary object to provide a simple and effective nut lock including essentially a locking pin or key positioned in an opening intersecting the bore of the nut, and engaged with the bolt to prevent rotational movement of the latter with relation to the nut.

Another object is to so construct the pin-receiving opening in the nut that during insertion of the locking pin or key the latter is so bent or distorted as to insure against its accidental removal.

With these and other objects in view, the invention consists in the novel construction, combination and arrangement of parts as will be hereinafter specifically described, claimed and illustrated in the accompanying drawing, in which:

Figure 1 represents a side elevation of the improved nut lock,

Fig. 2 represents a transverse sectional view on the line 2—2 of Fig. 1, and

Fig. 3 represents an end elevation of the nut lock.

Referring to the drawing in detail, wherein similar reference numerals designate corresponding parts throughout the several views, the numeral 5 indicates generally the shank of a bolt, of the usual or any preferred construction, including the usual head 6 and external screw threads 7 extending inwardly from the end of the shank opposite the head 6. A nut 8 is provided with an internally screw threaded bore 8ⁿ receiving the threaded terminal of the shank 5 and the latter is formed with a longitudinally extending groove 9, which is concave in cross section and designed to deflect the end of the locking pin, as will hereinafter appear.

The nut 8 is formed with four or more radial openings 10, which extend from the bore to the side faces of the nut.

A locking pin or key 12 is inserted in two of the angular openings 10, and is provided at one end with a head 13 and a tapered opposite end 14.

In use, the nut 8 is advanced to the desired position upon the bolt shank 5 and is turned so as to register the groove 9 with the inner ends of two of the openings 10, as shown in Fig. 2. The tapered end 14 of the locking pin is subsequently inserted in the opening 10 in the nut and is driven, by blows delivered upon the head 13 by a hammer or other tool, to the position illustrated in Fig. 2, thereby curving the shank and engaging the medial portion thereof in the groove 9 and consequently locking the nut against rotational movement upon the bolt. It will be understood, that as the locking pin is driven into position, the inclined surface of the tapered end 14 thereof engages and is deflected by the concave surface of the groove 9 and is thus caused to turn outwardly and enter the angular end 11 of the opening. To further insure against loss of the locking pin, the latter may be driven to the position illustrated in Fig. 3 and the tapered end 14 subsequently turned back against the adjacent face of the nut, so as to prevent the locking pin from being withdrawn in one direction, the head 13 preventing it from removal in the opposite direction.

What I claim is:

1. A nut lock including a bolt having a concave groove extending longitudinally thereof to provide a deflecting surface, a nut fitted on said bolt having radial openings communicating with the bore of said nut, and a locking pin adapted to be engaged in the openings and deflected by the deflecting surface to lock the nut against rotary movement upon the bolt.

2. A nut lock including a bolt having a longitudinal groove concave in cross section, a nut fitted upon said bolt having radial openings communicating with the bore thereof, and a malleable locking pin adapted for insertion in said openings and to engage in the groove in said bolt to lock the latter against rotational movement with relation to said nut.

3. A nut lock including a bolt having a longitudinal groove concave in cross section, a nut fitted on said bolt having radial openings intersecting the bore thereof, a locking pin adapted for insertion in said radial openings and to engage the groove in said bolt, one end of said locking pin being tapered, and a head carried by the opposite end thereof.

In testimony whereof I affix my signature in presence of two witnesses.

HARRY W. E. PAUL.

Witnesses:
B. J. BECHTEL,
Mrs. R. C. PRENTICE.